United States Patent
Lauwers et al.

(10) Patent No.: US 12,228,498 B2
(45) Date of Patent: Feb. 18, 2025

(54) PHOTOACOUSTIC OR PHOTOTHERMAL DETECTOR COMPRISING AN OPTICAL TRANSDUCER

(71) Applicants: COMMISSARIAT A L'ENERGIE ATOMIQUE ET AUX ENERGIES ALTERNATIVES, Paris (FR); UNIVERSITE GRENOBLE ALPES, Saint Martin D'heres (FR); CENTRE NATIONAL DE LA RECHERCHE SCIENTIFIQUE, Paris (FR); INSTITUT POLYTECHNIQUE DE GRENOBLE, Grenoble (FR)

(72) Inventors: Thomas Lauwers, Grenoble (FR); Skandar Basrour, Grenoble (FR); Jean-Guillaume Coutard, Grenoble (FR); Alain Gliere, Grenoble (FR); Guillaume Laffont, Grenoble (FR)

(73) Assignees: COMMISSARIAT A L'ENERGIE ATOMIQUE ET AUX ENERGIES ALTERNATIVES, Paris (FR); UNIVERSITE GRENOBLE ALPES, Saint Martin d'Heres (FR); CENTRE NATIONAL DE LA RECHERCHE SCIENTIFIQUE, Paris (FR); INSTITUT POLYTECHNIQUE DE GRENOBLE, Grenoble (FR)

( * ) Notice: Subject to any disclaimer, the term of this patent is extended or adjusted under 35 U.S.C. 154(b) by 277 days.

(21) Appl. No.: 17/757,935

(22) PCT Filed: Dec. 24, 2020

(86) PCT No.: PCT/EP2020/087866
§ 371 (c)(1),
(2) Date: Jun. 23, 2022

(87) PCT Pub. No.: WO2021/130364
PCT Pub. Date: Jul. 1, 2021

(65) Prior Publication Data
US 2022/0364981 A1    Nov. 17, 2022

(30) Foreign Application Priority Data

Dec. 27, 2019    (FR) ..................... 19 15696

(51) Int. Cl.
*G01N 21/31*    (2006.01)
*G01N 21/17*    (2006.01)

(52) U.S. Cl.
CPC ..... *G01N 21/1702* (2013.01); *G01N 21/1717* (2013.01); *G01N 21/31* (2013.01);
(Continued)

(58) Field of Classification Search
CPC ... G01N 2021/1704; G01N 2021/1706; G01N 2021/1731; G01N 21/1702; G01N 21/1717; G01N 21/31
See application file for complete search history.

(56) References Cited

U.S. PATENT DOCUMENTS

2006/0123884 A1* 6/2006 Selker ................ G01N 21/1702
73/24.02
2007/0206193 A1* 9/2007 Pesach ................ A61B 5/0095
356/432

(Continued)

FOREIGN PATENT DOCUMENTS

WO    WO 2019/170884 A1    9/2019

OTHER PUBLICATIONS

Kehl et al. ("Design of a Label-Free, Distributed Bragg Grating Resonator Based Dielectric Waveguide Biosensor", Photonics 2(1): 124-138, 2015) (Year: 2015).*

(Continued)

*Primary Examiner* — Hina F Ayub
(74) *Attorney, Agent, or Firm* — Oblon, McClelland, Maier & Neustadt, L.L.P.

(57) ABSTRACT

The invention is a device and method for detecting an analyte in a medium. An exciting light source produces an exciting light wave, which propagates to the medium and heats the latter. The device comprises a transducer for (Continued)

detecting the heating of the medium. According to one embodiment, the transducer is a thermal transducer, configured to detect a variation in the temperature of the medium. According to another embodiment, the transducer is an acoustic transducer, configured to detect a photoacoustic wave propagating from the medium. Whatever the embodiment, the transducer employs a membrane, on which a waveguide is placed. The waveguide comprises a resonant optical cavity. Transduction is achieved by analyzing a variation in a resonant wavelength of the optical cavity.

18 Claims, 10 Drawing Sheets

(52) U.S. Cl.
CPC ............... *G01N 2021/1704* (2013.01); *G01N 2021/1706* (2013.01); *G01N 2021/1731* (2013.01)

(56) References Cited

U.S. PATENT DOCUMENTS

| | | | |
|---|---|---|---|
| 2012/0151994 A1* | 6/2012 | Hung | G01N 21/1702 73/24.02 |
| 2021/0055473 A1 | 2/2021 | Shnaiderman et al. | |

OTHER PUBLICATIONS

International Search Report & Written Opinion issued Apr. 9, 2021 in PCT/EP2020/087866 filed on Dec. 24, 2020, 17 pages (with English Translation of Categories of Cited Documents).

Rosenthal, A. et al., "Embedded ultrasound sensor in a silicon-on-insulator photonic platform", Applied Physics Letters, vol. 104, No. 2, Jan. 13, 2014, 4 pages.

Wei, H. et al., "Direct laser writing of a phase-shifted Bragg grating waveguide for ultrasound detection", Optics Letters, vol. 44, No. 15, Jul. 25, 2019, 4 pages.

Yang, Q. et al., "Time-resolved photoacoustic spectroscopy using fiber Bragg grating acoustic transducers", Optics Communications, vol. 276, No. 1, Jun. 7, 2007, pp. 97-106.

Guan, B. et al., "Acoustic and Ultrasonic Detection With Radio-Frequency Encoded Fiber Laser Sensors", IEEE Journal of Selected Topics in Quantum Electronics, vol. 23, No. 2, Mar. 1, 2017, 12 pages.

Wu, J. et al., "Fiber-optic photo-acoustic spectroscopy sensor for harsh environment gas detection", Proceedings of Spie, Sep. 17, 2007, pp. 8 pages.

Leinders, S.M. et al., "A sensitive optical micro-machined ultrasound sensor (OMUS) based on a silicon photonic ring resonator on an acoustical membrane", Scientific Reports, vol. 5, No. 1, Sep. 22, 2015, 9 pages.

* cited by examiner

PHOTOACOUSTIC OR PHOTOTHERMAL DETECTOR COMPRISING AN OPTICAL TRANSDUCER

TECHNICAL FIELD

The technical field of the invention is detection of an analyte in a medium according to the principle of photoacoustic detection or photothermal detection.

PRIOR ART

Photoacoustic detection is based on detection of an acoustic wave generated under the effect of absorption, by an analyzed medium, of a pulsed or amplitude-modulated exciting electromagnetic wave, called the exciting wave. The acoustic wave is formed following heating, under the effect of absorption of the exciting wave, of absorbent molecules present in the analyzed medium. The heating leads to a modulated thermal expansion of the medium, said expansion being the origin of the acoustic wave.

Photoacoustic detection may be made specific to one particular analyte, by setting the wavelength of the exciting wave to an absorption wavelength of the analyte. Photoacoustic detection has thus been applied to the detection of gas species in a gas, or to the detection of the presence of particular molecules in biological tissues. The wavelength of the incident wave is frequently located in the infrared.

Photoacoustic detection is then a non-invasive analysis technique that may be applied to scattering or opaque media.

Applications of photoacoustic detection to biological tissues are for example described in the following publications:
Bauer A J. "IR-spectroscopy for skin in vivo: Optimal skin sites and properties for non-invasive glucose measurement by photoacoustic and photothermal spectroscopy"; Journal of Biopohtonics 11 (2018);
"Windowless ultrasound photoacoustic cell for in-vivo mid-IR spectroscopy of human epidermis: Low interference by changes of air pressure, temperature, and humidity caused by skin contact opens the possibility for a non-invasive monitoring of glucose in the interstitial fluid", Rev. Sci. Instrum. 84, 084901 (2013).

In these publications, a pulsed laser light source that is activated at a frequency of several tens of kilohertz is employed. The objective is to estimate a glucose concentration in the interstitial bodily fluid, at a depth comprised between 10 μm and 50 μm under the skin of a user. To this end, a photoacoustic detecting device placed against the skin of a user is used.

The technique of photothermal detection, which is based on detection of a variation in a temperature of an analyzed medium, under the effect of absorption, by the medium, of a pulsed or amplitude-modulated exciting electromagnetic wave, is also known. The temperature variation results from heating, under the effect of absorption of the exciting wave, of absorbent molecules present in the analyzed medium.

The periodic temperature modulation may for example be detected by estimating a variation in the refractive index of the medium, under the effect of the temperature variation. This is for example described in EP3359949B1.

Whether photothermal detection or photoacoustic detection is employed, the sample may be a gas sample, the targeted objective being detection of certain gas species or of certain particles that may, for example, be considered to be pollutants. It may also be a question of liquid or solid samples, there potentially being applications in the industrial field (field of the food industry for example), or in the health field as mentioned above.

The inventors have designed a transducer that may be employed either in applications employing photoacoustic detection, or in applications employing photothermal detection. It allows devices that are dedicated to each application, that have a high detection sensitivity, and that are of simple design to be obtained.

SUMMARY OF THE INVENTION

A first subject of the invention is a detecting device, intended to be applied, via a contact face, against a medium to be analyzed, the analyzed medium being liable to contain an analyte, which absorbs light at at least one absorption wavelength, the device comprising:
  an aperture, formed in the contact face;
  an exciting light source, configured to emit an exciting light wave, which is pulsed or amplitude-modulated at an excitation frequency, in an excitation spectral band comprising the absorption wavelength, the device being arranged such that the exciting light wave propagates through the aperture, toward the analyzed medium;
  a transducer, intended to measure a response of the medium following absorption, by the analyte, of some of the exciting light wave;
the device being characterized in that the transducer comprises:
  a membrane, carrying a waveguide;
  the waveguide comprising a first reflector, and a second reflector, each reflector reflecting light in a reflection spectral band;
  the first reflector and the second reflector being spaced apart from each other, so as to form a resonant optical cavity, the resonant optical cavity defining a resonant wavelength, in the reflection spectral band;
such that the waveguide:
  transmits light at the resonant wavelength;
  reflects light, in the reflection spectral band, not of the resonant wavelength;
the transducer also comprising:
  a source of auxiliary laser light, configured to emit an auxiliary light wave, in the reflection spectral band, into the waveguide;
  a photodetector, arranged to detect a light wave transmitted by the waveguide at the resonant wavelength;
  a servo circuit, connected to the photodetector, and configured to determine a periodic time-dependent modulation of the resonant wavelength of the resonant optical cavity.

The device may comprise a processing unit, connected to the servo circuit, and configured to:
  estimate an amplitude of the time-dependent modulation of the resonant wavelength;
  detect the presence of the analyte in the medium depending on the estimated amplitude.

The processing unit may be configured to estimate a concentration of the analyte in the medium depending on the estimated amplitude.

According to one embodiment, referred to as the photoacoustic embodiment, the device comprises a hollow cavity that opens onto the aperture, the transducer being connected to the hollow cavity. The transducer is an acoustic transducer configured to detect an amplitude of a photoacoustic wave that propagates from the aperture through the hollow cavity, such that, under the effect of the illumination of the medium by the exciting light wave, the membrane vibrates at the excitation frequency, resulting in the time-dependent modulation of the resonant wavelength, at a modulation frequency equal to the excitation frequency.

The membrane may lie parallel to the contact face. The membrane may bound one portion of the hollow cavity.

According to one embodiment, called the photothermal embodiment, the device is such that:
  the membrane of the transducer forms the contact face of the device, the contact face being intended to be applied so as to make contact with the medium;
  the aperture extends through the membrane;
  the transducer is a thermal transducer, such that, under the effect of the illumination of the medium by the exciting light wave, the temperature of the membrane exhibits a periodic time-dependent variation, resulting in the periodic time-dependent modulation of the resonant wavelength.

Whatever the embodiment, at least one reflector, or each reflector, is a Bragg mirror, formed via a periodic modulation of a refractive index along the waveguide.

Whatever the embodiment, the servo circuit comprises a servo loop, connected to the auxiliary light source, and configured to servo-control the wavelength of the light wave emitted by the auxiliary light source to the resonant wavelength of the resonant optical cavity. The servo circuit may notably implement a Pound-Drever-Hall servo technique.

Whatever the embodiment, the device may be such that:
  the first reflector is a first Bragg mirror;
  the second reflector is a second Bragg mirror;
  the first Bragg mirror and the second Bragg mirror form the same Bragg mirror, the latter comprising a defect, the first Bragg mirror and the second Bragg mirror corresponding to the portions of the Bragg mirror lying on either side of the defect, respectively.

In the photoacoustic embodiment, the device may be such that:
  the membrane exhibits, under the effect of the vibration, at least one vibration antinode, the amplitude of vibration being maximum at each antinode;
  the waveguide lies level with at least one antinode.

Whatever the embodiment, the waveguide may be formed directly on the membrane. The first reflector and the second reflector may be obtained by inscribing the waveguide with a laser beam, so as to obtain a periodic modulation of the refractive index in the waveguide.

Whatever the embodiment, the waveguide may be a microstructured optical fiber deposited on the membrane.

A second object of the invention is a method for detecting an analyte in a medium, the analyte absorbing light at at least one absorption wavelength, the method comprising the following steps:
  a) applying a device according to the first subject of the invention against the medium, such that the contact face of the device is held against the medium;
  b) activating the exciting light source, the exciting light source emitting an exciting light wave, which is pulsed or amplitude-modulated, at an excitation frequency, with a wavelength corresponding to an absorption wavelength of the analyte;
  c) determining, by means of the servo circuit, a periodic modulation of a resonant wavelength of the waveguide of the transducer, at a modulation frequency corresponding to the excitation frequency, the resonant wavelength corresponding to a transmission peak of the waveguide;
  d) depending on the periodic modulation determined by the servo circuit, detecting the presence of the analyte in the medium.

The device may be such as described with regard to the photoacoustic embodiment. The method may then comprise:
  following step b), heating the medium periodically, at the excitation frequency, so as to cause an emission of a photoacoustic wave, which propagates through the hollow cavity, and under the effect of which the membrane of the transducer vibrates at the excitation frequency, such that the resonant frequency of the waveguide of the transducer is modulated at a modulation frequency equal to the excitation frequency;
  in step d):
    estimating an amplitude of the periodic modulation of the resonant wavelength at the modulation frequency;
    detecting the presence of analyte depending on the estimated amplitude.

The device may be such as described with regard to the photothermal embodiment. The method may then comprise:
  following step b), heating the medium periodically, at the excitation frequency, so as to cause periodic heating of the membrane at the excitation frequency, such that the resonant frequency of the waveguide of the transducer is modulated at a modulation frequency corresponding to the excitation frequency;
  in step d):
    estimating an amplitude of the periodic modulation of the resonant wavelength at the modulation frequency;
    detecting the presence of analyte depending on the estimated amplitude.

Whatever the embodiment, step d) may also comprise estimating a concentration of the analyte in the analyzed medium.

A third subject of the invention is a process for fabricating a device according to the first subject of the invention, the waveguide being formed directly on the membrane, the process comprising:
  depositing a thin layer of a first material on a membrane, so as to form a waveguide;
  inscribing the waveguide with a femtosecond laser beam, so as to obtain a periodic modulation of a refractive index of the waveguide.

The invention will be better understood on reading the description of the examples of embodiment, which are described, in the rest of the description, with reference to the figures listed below.

FIGURES

FIGS. 1A to 1E schematically show the main components of a device according to one embodiment, referred to as the photoacoustic embodiment.

Figure 4A:
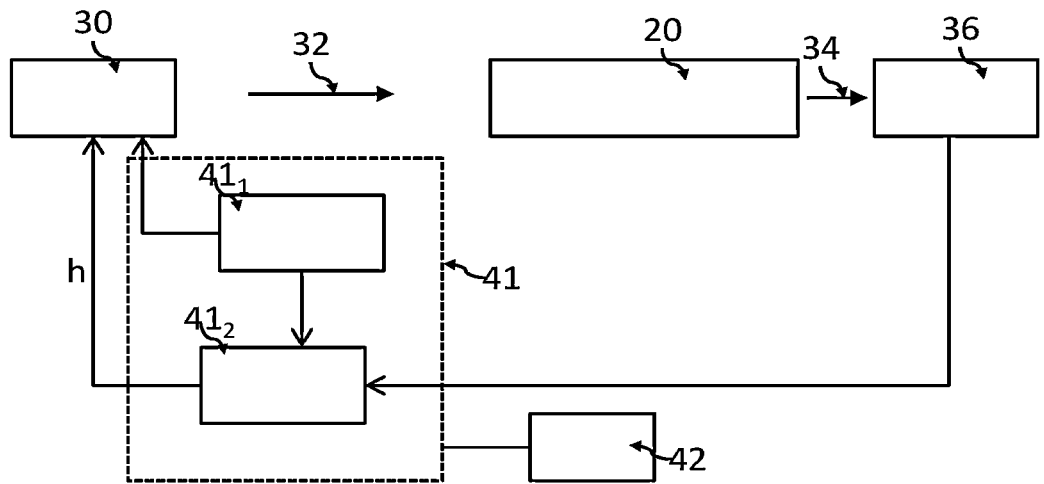

FIG. 4A schematically shows a circuit for servo-controlling the wavelength of the auxiliary light source using a wavelength-locking method.

Figure 4B:
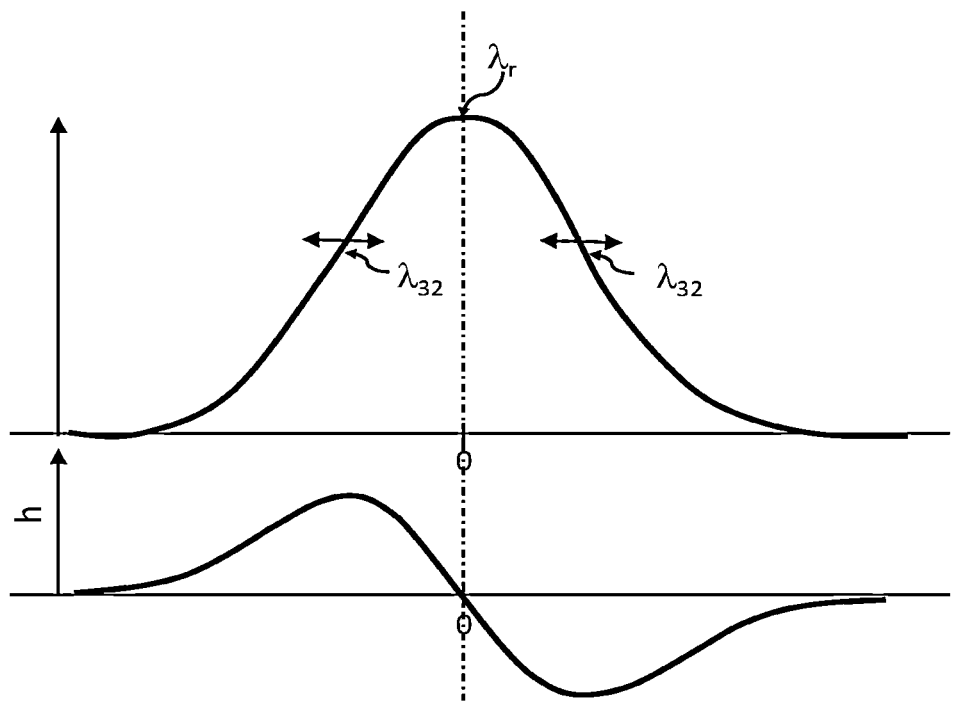

FIG. 4B shows the variation in an error function obtained using the wavelength-locking method.

Figure 5A:
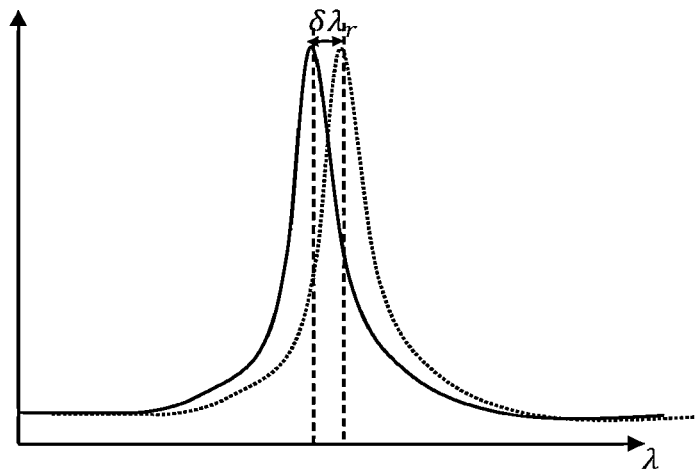

FIG. 5A illustrates a shift in the resonant wavelength of a resonant optical cavity, under the effect of a vibration of the membrane.

Figure 5B:
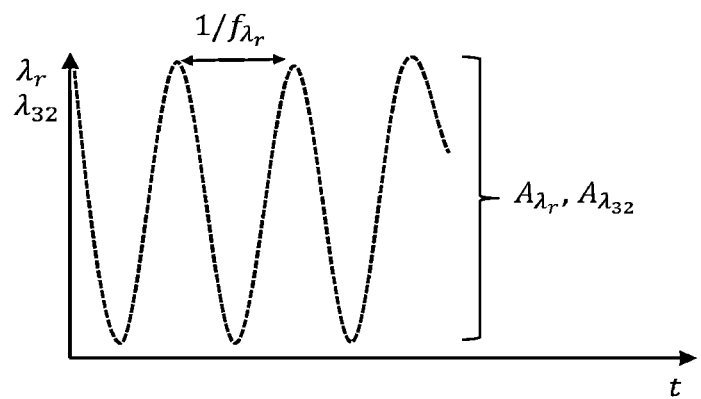

FIG. 5B shows a time-dependent modulation of the optical resonant wavelength.

Figure 5C:
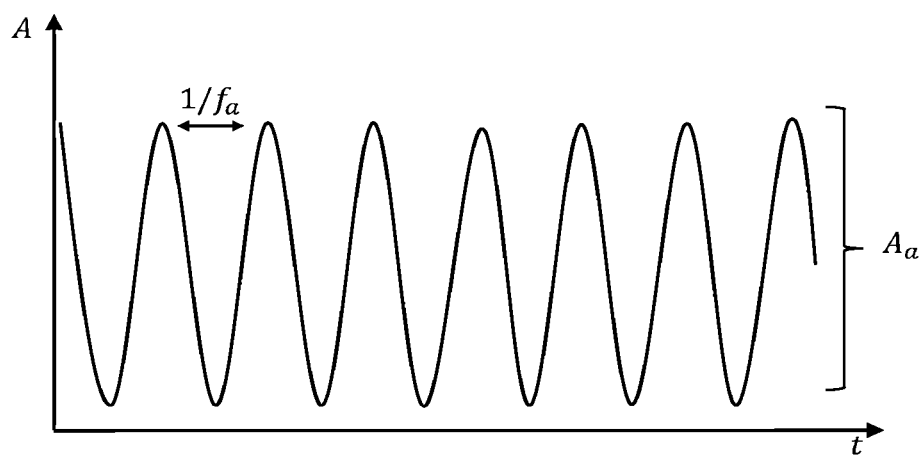
Figure 6A:
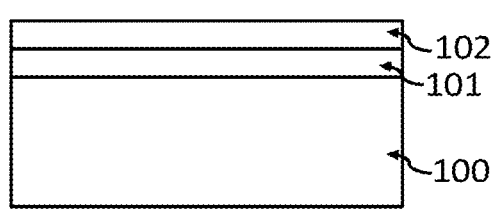
Figure 6B:
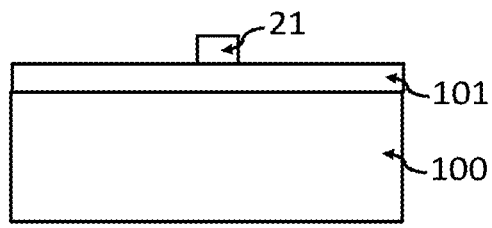
Figure 6C:
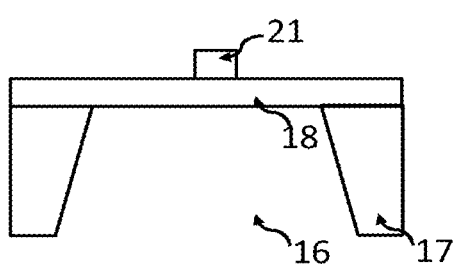
Figure 6D:
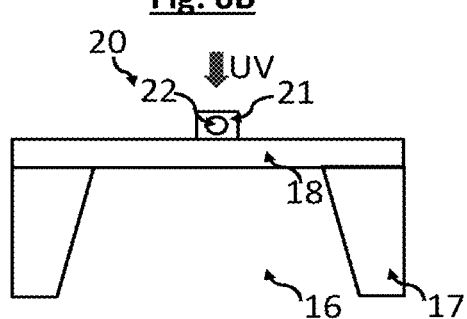

FIG. 5C schematically shows an estimate of the amplitude of vibration of a membrane based on the time-dependent modulation of the resonant wavelength.

FIGS. 6A to 6D show the main steps of a fabricating process that allows a microstructured waveguide to be formed in contact with a membrane.

Figure 7A:
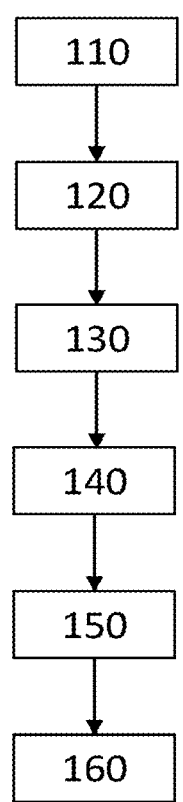

FIG. 7A shows the main steps of a detecting method employing the device according to the photoacoustic embodiment.

Figure 7B:
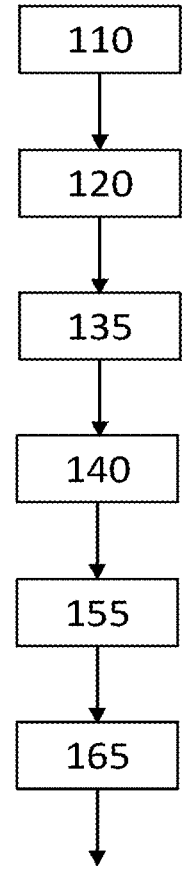

FIG. 7B shows the main steps of a detecting method employing the device according to the photothermal embodiment.

Figure 8A:
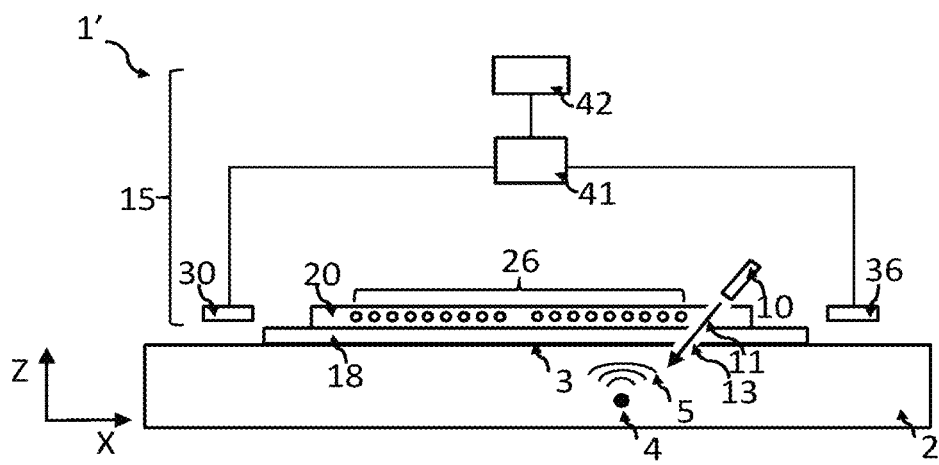
Figure 8B:
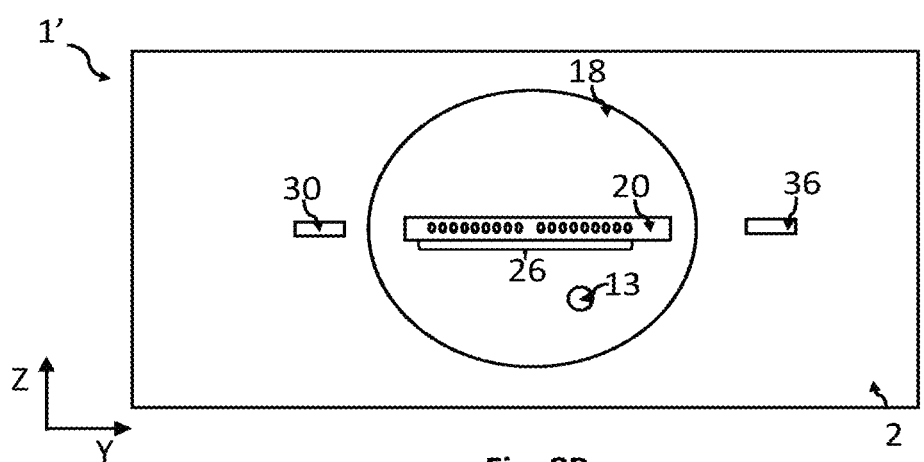
Figure 8C:
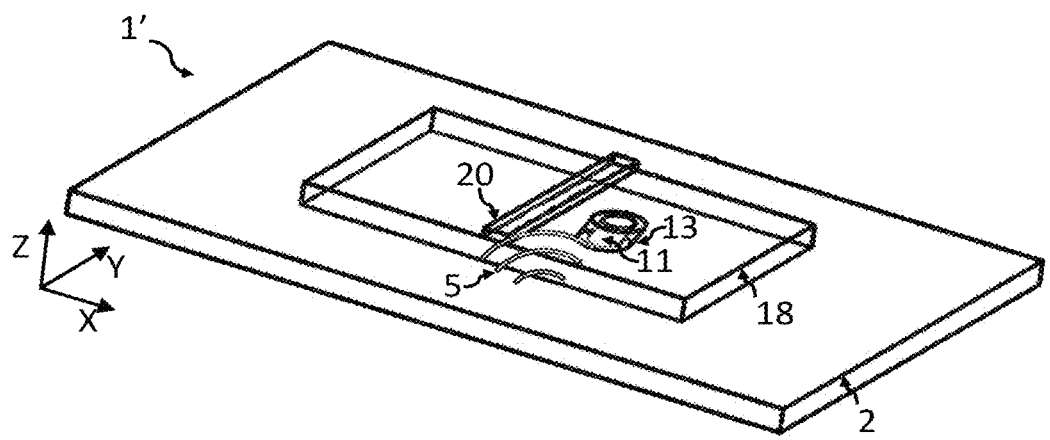

FIGS. 8A to 8C schematically show the main components of a device according to one embodiment, referred to as the photothermal embodiment.

DESCRIPTION OF PARTICULAR EMBODIMENTS

FIGS. 1A to 1E illustrate a first embodiment, referred to as the photoacoustic embodiment, of a device 1 according to the invention. The device 1 is configured to be applied against a medium 2 to be analyzed.

The device comprises an exciting light source 10, configured to emit an exciting light wave 11 that propagates to the medium 2 to be analyzed. The light source 10 is pulsed or amplitude-modulated, at an excitation frequency $f_{11}$. The light wave 11 is emitted in an excitation spectral band $\Delta\lambda_{11}$ comprising an absorption wavelength $\lambda_4$ of an analyte 4 present in the medium. One objective of the device 1 is to detect the presence of the analyte 4 and potentially to estimate a concentration thereof.

The exciting spectral band preferably lies in the visible or in the infrared and for example extends between wavelengths of 3 μm and 15 μm. Preferably, the exciting spectral band $\Delta\lambda_{11}$ is narrow enough for the device 1 to be specific to a single analyte. For example, the width of the emission spectral band is of the order of 1 $cm^{-1}$. When the analyte is glucose, the emission spectral band is centered on a wavelength of absorption of glucose, 1034 $cm^{-1}$ for example. The exciting light source 10 may notably be a pulsed laser source and may for example be a wavelength-tunable quantum cascade laser (QCL). The emission spectral band $\Delta\lambda$ is then located in the infrared.

The analyte 4 may be a molecule present in the analyzed medium. When the medium is a biological tissue, it may be a question of glucose present in a bodily fluid of the biological tissue. As mentioned with regard to the prior art, the analyte may be a gas molecule, the medium being a gas. It may for example be a gas molecule considered to be a pollutant. The medium may also be a liquid, the analyte being a molecule potentially present in the liquid.

The device 1 comprises a contact face 3, intended to be applied against the medium 2 to be analyzed, so as to make contact with the latter. The contact face 3 is designed to conform to the medium 2 against which it is intended to be applied. It is for example planar.

The device 1 comprises an enclosure 17 that extends from the contact face 3, and that defines a hollow cavity 16. The hollow cavity 16 comprises an aperture 13, formed in the contact face 3, so as to open onto the medium 2. The exciting light source 10 is configured such that the exciting light wave 11 propagates to the medium 2 through the hollow cavity 16, and through the aperture 13.

Under the effect of the presence of an analyte 4 in the medium 2, a photoacoustic wave 6 is formed. The photoacoustic wave 6 is an acoustic wave formed as a result of periodic heating of the medium by the incident light wave 11, the latter being amplitude-modulated at the excitation frequency $f_{11}$. Some of the photoacoustic wave 6 propagates through the hollow cavity 16 so as to be detected by a transducer 15.

In the photoacoustic embodiment, the transducer 15 is an acoustic transducer. Its function is to measure an amplitude and/or frequency of the photoacoustic wave 6. More precisely, in the targeted application, the transducer 15 allows an amplitude of the photoacoustic wave 6 at the excitation frequency $f_{11}$ of the exciting light wave to be estimated.

The transducer 15 comprises a flexible membrane 18, configured to vibrate when exposed to the photoacoustic wave 6. The membrane 18 preferably lies parallel to a radial plane $P_{XY}$. The diameter of the membrane, or its largest diagonal, is comprised between 1 mm and 10 mm. The thickness of the membrane, parallel to a transverse axis Z, perpendicular to the radial plane, is preferably comprised between 10 μm and 500 μm, and preferably between 10 μm and 100 μm. The thickness of the membrane is preferably comprised between 1/10 and 1/200 of the radius of the membrane (or of its largest half-diagonal).

The exciting light source 10 is configured such that the exciting light wave 11 propagates to the medium 2 through the hollow cavity 16. In the example shown in FIG. 1A, the exciting light wave 11 propagates through a secondary aperture 19 formed through the membrane 18.

The secondary aperture 19 formed in the membrane may also allow the pressures on either side of the membrane 18 to be brought into equilibrium, at low frequency. This allows a potential deformation of the membrane 18 under the effect of a low-frequency variation in the pressure on either side of the membrane 18 to be avoided. By low-frequency variation in pressure, what is meant is a pressure difference that occurs at a frequency lower than an operating frequency range of the membrane. The diameter of the secondary aperture 19 is for example smaller than one tenth of the diameter of the membrane. It is for example of the order of 10 μm or 20 μm.

The transducer 15 comprises a waveguide 20 that extends over the membrane 18, in contact with the latter and parallel to the latter. The waveguide extends between an entrance $20_i$ and an exit $20_o$. The waveguide is made from a first material 21 with a first refractive index $n_1$.

The waveguide 20 may be an optical fiber, in which case the first material is the material of the core of the optical fiber. It may also be a question of a waveguide formed from a deposit of a thin layer of the first material 21, SiON (silicon oxynitride) for example, this corresponding to the example shown in FIGS. 1A to 1E. The waveguide is bounded by a confining material 23, the refractive index of which is lower than the refractive index $n_3$ of the first material $n_1$. When the waveguide 20 is an optical fiber, the confining material 23 is the cladding of the optical fiber.

The waveguide 20 is advantageously formed from a thin layer of the first material 21, and the confining material 23 may simply be the air surrounding the first material. The thickness of the waveguide, along the transverse axis Z, is preferably smaller than 10 µm or 5 µm. The process used to form such a waveguide is described with reference to FIGS. 6A to 6D. Forming a waveguide directly on the membrane allows a step of bonding the optical fiber to the membrane to be avoided. Another advantage, with respect to use of an optical fiber, is that this allows a less rigid waveguide to be obtained.

Whatever the chosen configuration, the refractive index $n_3$ of the confining material 23 is lower than the refractive index $n_1$ of the first material 21. When the first material 21 is deposited directly on the membrane 18, it is preferable for the refractive index $n_1$ of the first material 21 to be higher than the refractive index of the material from which the membrane 18 is formed.

Figure 1A:
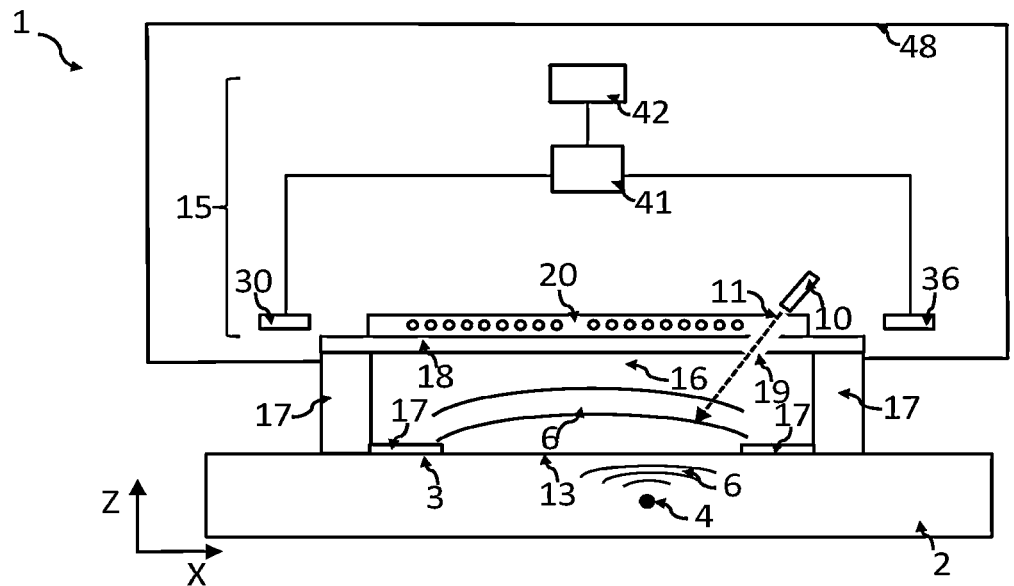
Figure 1B:
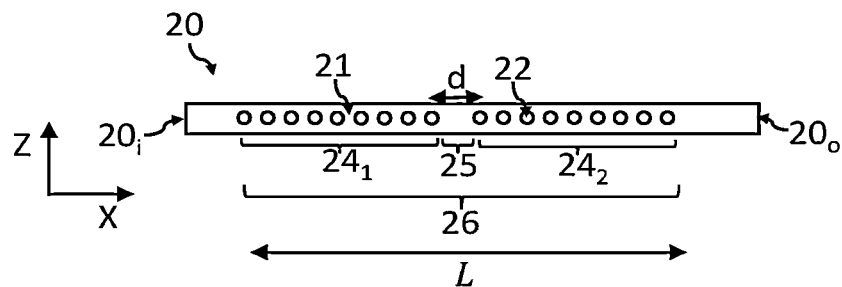

One example of a waveguide 20 is illustrated in FIG. 1B. In this example, the first material 21 is deposited on the membrane 18. The waveguide comprises segments of a second material 22, of a second refractive index $n_2$, these segments being periodically distributed along the waveguide 20. The second refractive index $n_2$ is different from the first refractive index $n_1$. It may be higher than the first refractive index $n_1$. The relative variation between the first refractive index and the second refractive index may vary from 0.01% ($10^{-4}$) to 0.1% ($10^{-3}$).

Along the axis defined by the waveguide, the refractive index is periodically modulated, between $n_1$ and $n_2$, so as to form a Bragg mirror in a reflection spectral band $\Delta\lambda_{20}$. The structure of a Bragg mirror is known to those skilled in the art. It is a structure in which the refractive index varies periodically, such that, along the axis along which the light propagates, the mirror is formed by an alternation of segments of two different indices, the optical thickness of each segment being $\lambda_B/4n_i$, where $\lambda_B$ is a central wavelength of the reflection spectral band $\Delta\lambda_{20}$ and $n_i$ is the refractive index of the material in question ($n_i=n_1$ or $n_i=n_2$). The lower the refractive index contrast, the higher the number of periods.

The reflection spectral band $\Delta\lambda_{20}$ is centered on a resonant wavelength $\lambda_r$. The latter is such that:

$$\lambda_r = \lambda_B = 2n_{eff}\Lambda \quad (1)$$

where $n_{eff}$ is an effective index of the grating, such that $$n_{eff} = \frac{n_1 + n_2}{2} \quad (2)$$

$\Lambda$ is the spatial period of the grating, i.e. the length of two successive segments 21 and 22 along the axis of the waveguide.

The waveguide 20 is such that the Bragg mirror, formed by the alternation of segments 21 and 22, comprises a defect. By defect, what is meant is a localized break in the periodicity of the refractive-index modulation. The defect for example corresponds to a continuous space 25, made of a given material, the first material 21 for example, extending the length of one period $\Lambda$ or the length of a plurality of successive periods. Level with the defect, the waveguide comprises a single material, extending a distance d along the axis of the waveguide 20. When the distance d is such that $$d = \frac{k\lambda_B}{n_{eff}}, \quad (1')$$

where k is a positive natural integer, a resonant Fabry-Perot optical cavity 26 is formed, defining a resonant wavelength $\lambda_r$. When the defect extends the length of a single period $\Lambda$, $\lambda_r = \lambda_B$ When $d > k\lambda_B/n_{eff}$, other resonant wavelengths $\lambda_r$ may appear, in the reflection spectral band $\Delta\lambda_{20}$, the resonant wavelengths being different from the Bragg wavelength $\lambda_B$. In such a case, the resonant wavelength at which the resonant peak is narrowest is preferably retained.

Thus, the defect allows, in the waveguide 20, a first Bragg mirror $24_1$ and a second Bragg mirror $24_2$ to be separated. The assembly formed by the first Bragg mirror $24_1$, the second Bragg mirror $24_2$, and the space 25 between the Bragg mirrors forms the resonant cavity 26.

The waveguide 20 is then structured to:
reflect light in the reflection spectral band $\Delta\lambda_{20}$ of the Bragg mirrors $24_1$, $24_2$, not of the resonant wavelength $\lambda_r$;
transmit light at the resonant wavelength $\lambda_r$ of the resonant cavity 26.

The transducer 15 also comprises an auxiliary light source 30, in particular a laser diode, arranged to emit an auxiliary light wave 32 toward the entrance $20_i$ of the waveguide 20. The auxiliary light wave 32 is emitted in an emission spectral band $\Delta\lambda_{32}$, centered on an emission wavelength $\lambda_{32}$. The emission spectral band $\Delta\lambda_{32}$ is preferably included in the reflection spectral band $\Delta\lambda_{20}$.

Preferably, the width of the emission spectral band $\Delta\lambda_{32}$ is narrower than the width of the reflection spectral band $\Delta\lambda_{20}$. For example, the width of the emission spectral band $\Delta\lambda_{32}$ may be 1 nm, or even smaller than 500 pm or 100 pm. By width of the emission spectral band $\Delta\lambda_{32}$, what is meant is a full width at half maximum of the emission spectral band.

The auxiliary light source 30 is preferably a continuous-wave laser. It may for example be a DFB laser diode (DFB being the acronym of distributed feedback), with a power of 1 mW, emitting at a wavelength of 1.55 µm, with a spectral width of the order of one pm. This type of laser diode is commonly used in the field of telecommunications.

The transducer 15 comprises a photodetector 36, preferably a fast photodetector, and here a photodiode. The photodetector has a detection spectral band $\Delta\lambda_{36}$ that contains the reflection spectral band $\Delta\lambda_{20}$.

The transducer 15 comprises a servo circuit 41, configured to follow a time-dependent modulation $\lambda_r(t)$ of the resonant wavelength $\lambda_r$ of the resonant cavity 26. Such a circuit is described below, with reference to FIGS. 4A and 4B. The servo circuit 41 allows the auxiliary light source 30 to be servo-controlled, such as to make the emission wavelength $\lambda_{32}$ of the auxiliary light wave 32 emitted by the auxiliary light source correspond to the resonant wavelength $\lambda_r$ of the resonant cavity 26.

The device comprises or is connected to a processing unit 42, which is configured to compute a frequency $f_{\lambda_r}$ or an amplitude $A_{\lambda_r}$ of the time-dependent modulation $\lambda_r(t)$ determined by the servo circuit 41. The processing unit 42 is for example designed or programmed to estimate an amplitude of the modulation of the resonant wavelength, at a frequency $f_{\lambda_r}$ corresponding to the excitation frequency $f_{11}$ of the exciting light wave 11. The operation of the processing unit 42 will be described in more detail with reference to FIGS. 5A to 5C.

The device comprises a cover 48 that defines a rear volume, the rear volume corresponding to the volume extending between the membrane 18 and the cover 48. Generally, the waveguide 20 comprises a resonant cavity 26, formed from a first reflector $24_1$ and from a second reflector $24_2$, said reflectors being obtained by microstructuring the waveguide 20. In the examples given in this description, the first reflector $24_1$ and the second reflector $24_2$ are Bragg mirrors, but other types of microstructures are envisionable.

One important facet of the invention, which facet is explained below, is to do with the fact that:
- when the auxiliary light source 30 is activated, and emits a light wave 32 the emission wavelength $\lambda_{32}$ of which does not correspond to the resonant wavelength $\lambda_r$ of the waveguide 20 (or more precisely of the resonant cavity 26), the waveguide 20 reflects a reflected wave 32'; but
- when the auxiliary light source 30 is activated, and emits a light wave 32 the emission wavelength $\lambda_{32}$ of which corresponds to the resonant wavelength $\lambda_r$ of the resonant cavity 26, the waveguide 20 transmits a transmitted wave 34 to the photodetector 36. The closer the emission wavelength $\lambda_{32}$ gets to the resonant wavelength $\lambda_r$, the higher the intensity of the transmitted wave 34.

The invention is based on the fact that, on being exposed to an acoustic wave 6 of acoustic frequency $f_a$, the membrane 18 vibrates with an amplitude $A_a$ of vibration at the frequency $f_a$ of the photoacoustic wave 6. This results in a periodic deformation of the waveguide 20, under the effect of which deformation the resonant wavelength $\lambda_r$ exhibits a periodic time-dependent modulation $\lambda_r(t)$. The amplitude $A_{\lambda_r}$ of the time-dependent modulation of the resonant wavelength depends on the amplitude of vibration of the membrane, said amplitude being proportional to the acoustic amplitude $A_a$. The frequency $f_{\lambda_r}$ of the time-dependent modulation corresponds to the acoustic frequency $f_a$, which also corresponds to the excitation frequency $f_{11}$. By computing the amplitude of the modulation $A_{\lambda_r}$ at the frequency $f_{\lambda_r}$, the device allows the presence of the analyte in the medium to be detected, and optionally a concentration thereof to be estimated, as described with reference to FIGS. 5A to 5C.

Figure 1C:
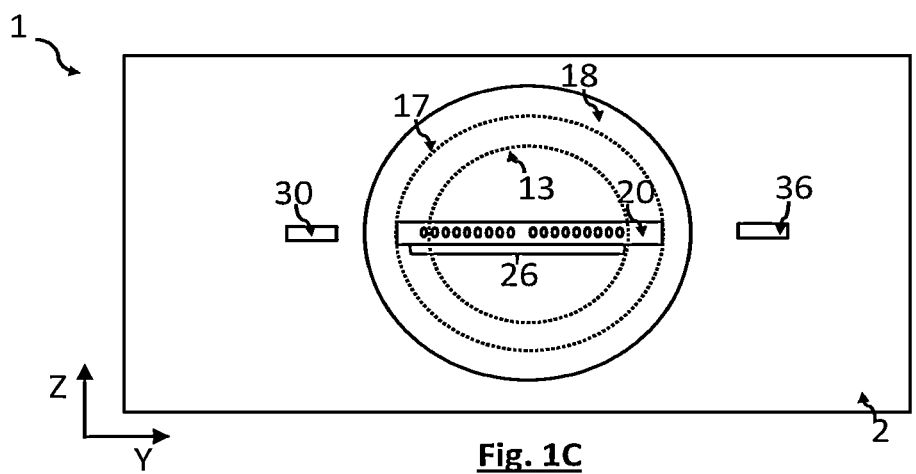

FIG. 1C shows a view of certain elements described with reference to FIG. 1A, in the radial plane $P_{XY}$. In this example, the membrane 18 takes the form of a thin disc, the thickness being one hundredth of the radius.

Figure 1D:
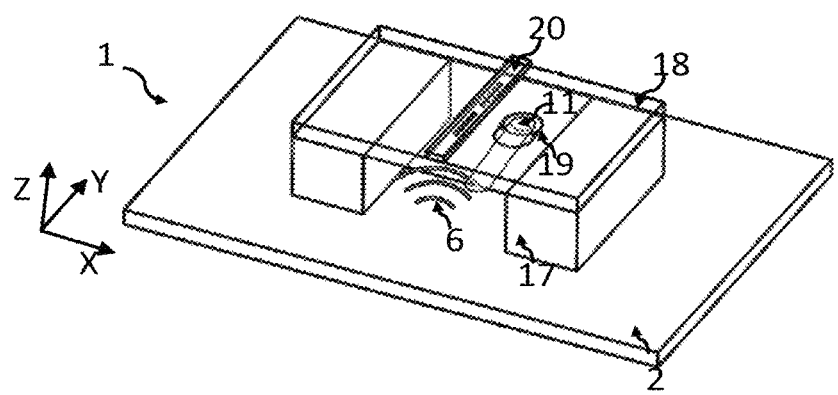

FIG. 1D is a 3D view showing the position of the membrane 18 and of the waveguide 20 with respect to the analyzed medium 2.

Figure 1E:
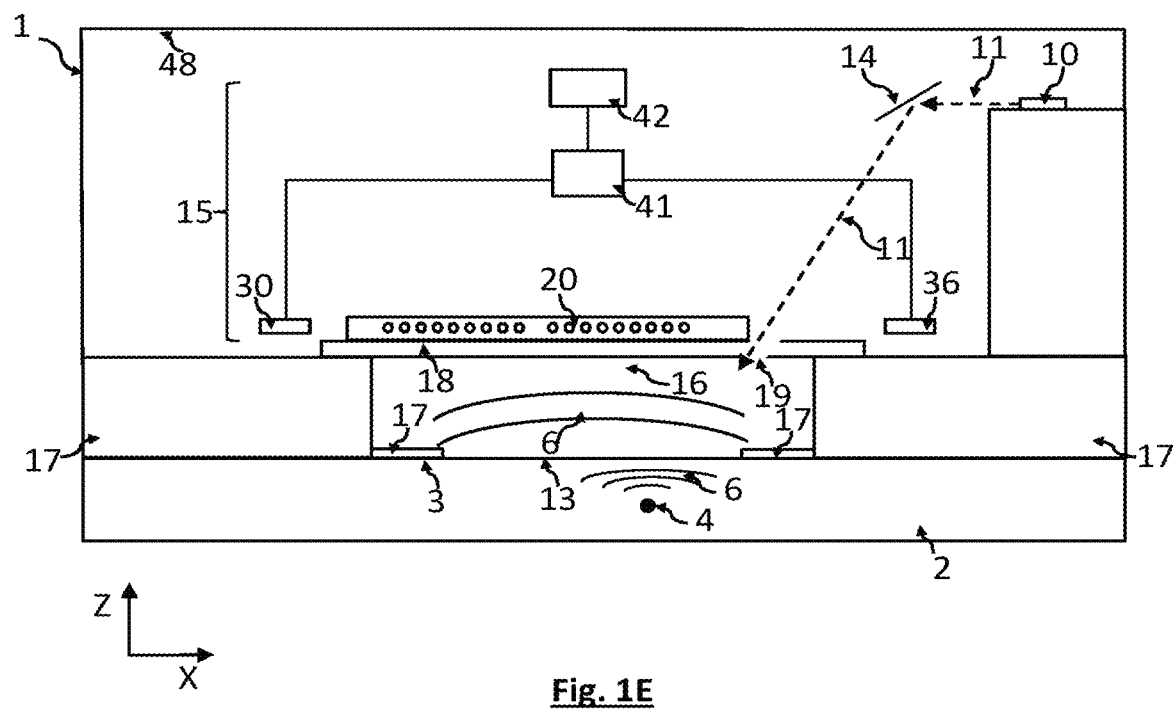

FIG. 1E shows an example of a device in which the exciting light source 10 is associated with a reflector 14. The exciting light wave 11 is emitted parallel to the radial plane $P_{XY}$, then is reflected, by the reflector 14, toward the aperture 13, so as to propagate toward the medium 2. The auxiliary light source 30 and the photodetector 36 are aligned with respect to the waveguide 20. Alternatively, the auxiliary light source 30 and/or the photodetector 36 may be coupled to the waveguide 20 by a photonic crystal.

According to one variant, the membrane 18 of the transducer 15 is connected to the cavity 16 by an acoustic channel, the latter transmitting some the photoacoustic wave 6 to the membrane 18.

Figure 2A:
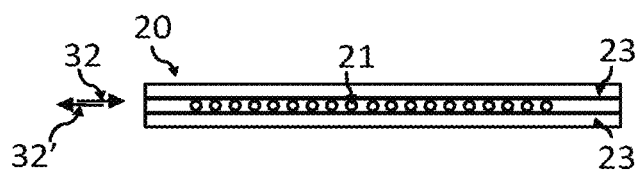
FIG. 2A shows a microstructured optical fiber, forming a Bragg mirror.
Figure 2B:
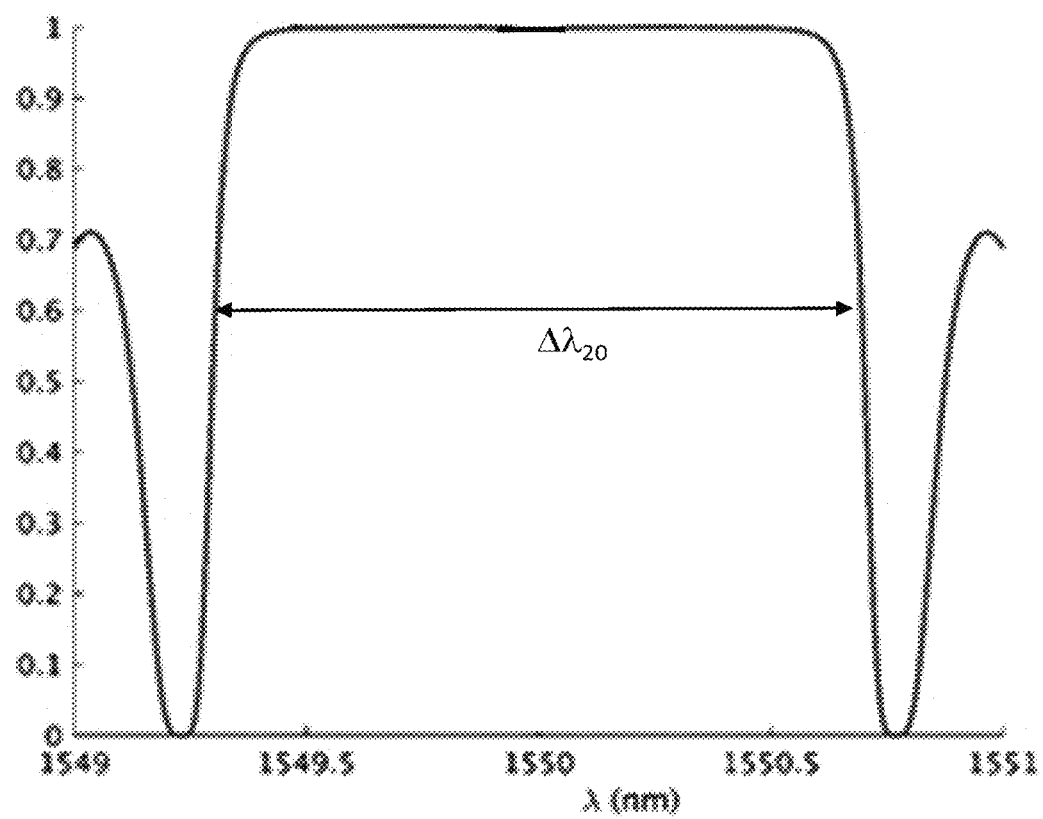
FIG. 2B shows a reflection spectral band of the optical fiber schematically shown in FIG. 2A.

FIG. 2A illustrates an embodiment in which the waveguide 20 is a microstructured optical fiber, inside of which a Bragg grating is formed. This type of microstructuring, in an optical fiber, is usually designated a fiber Bragg grating (FBG). The optical fiber comprises a first material 21 forming the core and a confining material 23 forming the cladding. In the core of the optical fiber are formed inclusions or cavities of a second material 22, the refractive index of which is different from that of the first material. FIG. 2B shows a reflection spectrum of the optical fiber thus microstructured. The reflection spectrum corresponds to a reflected intensity normalized by the illumination intensity (y-axis) as a function of wavelength (x-axis—unit nm). The reflection is maximum in the reflection spectral band $\Delta\lambda_{20}$. Thus, when such a waveguide is illuminated by a light wave 32, in the reflection spectral band $\Delta\lambda_{20}$, it reflects a light wave 32', in the entire reflection spectral band $\Delta\lambda_{20}$.

Figure 2C:
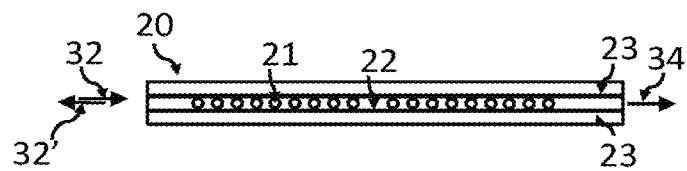
FIG. 2C shows a microstructured optical fiber, forming a resonant optical cavity based on two spaced-apart Bragg mirrors.

FIG. 2C illustrates a similar optical fiber, in which two Bragg mirrors $24_1$ and $24_2$ are separated by a space 25 filled with the first material 21, as described with reference to FIG. 1B. When the length of the space 25 corresponds to $$\frac{k}{n_{eff}}$$

times a resonant wavelength, comprised in the reflection spectral band, the optical fiber comprises a resonant cavity 26.

Figure 2D:
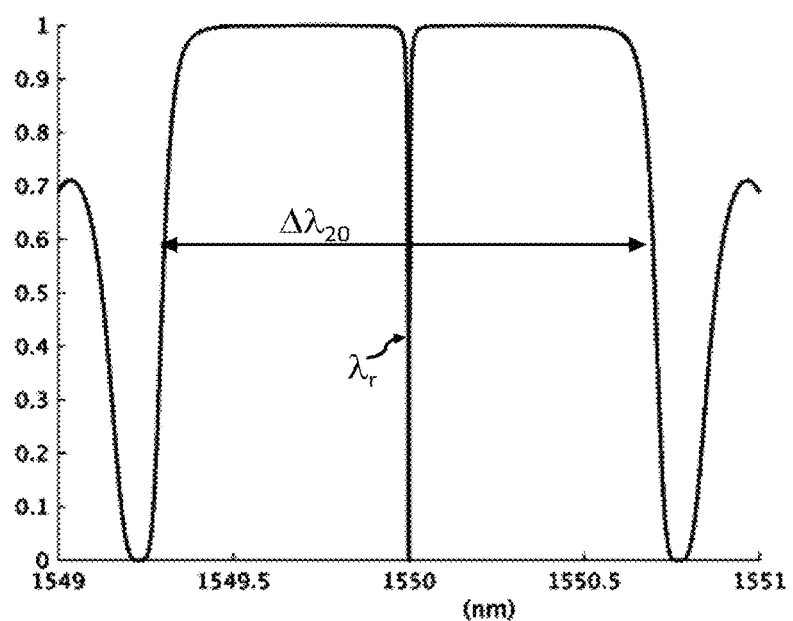
FIG. 2D shows a reflection spectral band of the optical fiber schematically shown in FIG. 2C.

FIG. 2D shows a reflection spectrum of the optical fiber thus microstructured. The reflection is maximum in the reflection spectral band $\Delta\lambda_{20}$, except at the resonant wavelength $\lambda_r$. Thus, when such a waveguide is illuminated by a light wave 32, emitted by the auxiliary light source 30, in the reflection spectral band $\Delta\lambda_{20}$, it reflects a light wave 32', if the wavelength $\lambda_{32}$ is different from the resonant wavelength, and transmits a light wave 34, called the transmitted light wave, when the wavelength $\lambda_{32}$ is located in the resonant peak.

FIGS. 2C and 2D were obtained using models, written in Matlab (registered trademark—Mathworks), in which the structuring was considered to extend along a length L of 3 mm, the index contrast between the first and second materials was considered to be $10^{-3}$, and the period of each Bragg mirror was considered to be about 0.5 μm. Thus, each Bragg mirror has a number of periods equal to 3000.

Figure 3A:
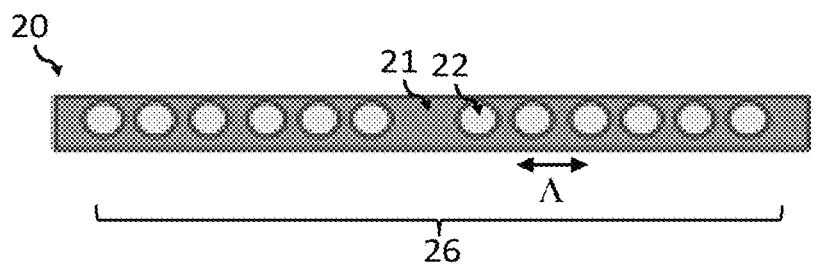
FIG. 3A shows a waveguide comprising a resonant optical cavity, the waveguide being undeformed.
Figure 3B:
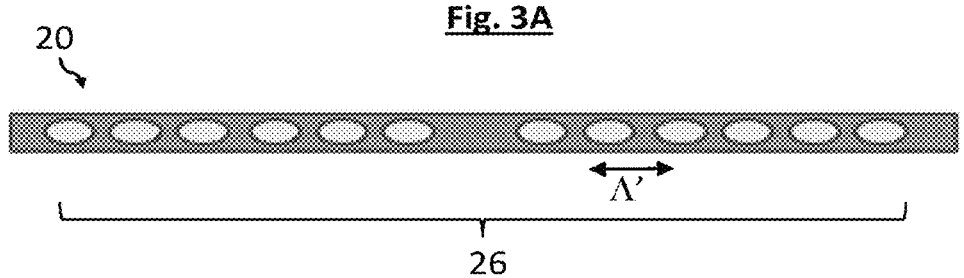
FIG. 3B shows a waveguide comprising a resonant optical cavity, the waveguide being deformed.
Figure 3C:
FIG. 3C shows a waveguide the deformation of which is non-uniform.

FIGS. 3A to 3C illustrate the variation in the resonant wavelength $\lambda_r$ resulting from a deformation of a waveguide 20 such as illustrated in FIG. 1B or 2C. FIGS. 3A and 3B show the waveguide 20 undeformed and deformed, respectively. Under the effect of the deformation, the spatial period of the index modulation varies from $\Lambda$ to $\Lambda'=\Lambda+d\Lambda$. Application of expression (1) results in a shift $d\lambda_B$ in the Bragg wavelength $\lambda_B$, about which wavelength extends the reflection spectral band $\Delta\lambda$. The shift of $\lambda_B$ is such that:

$$\frac{1}{\lambda_B} \times \frac{\partial \lambda_B}{\partial \varepsilon} = 0.78 \times 10^{-6} \mu \varepsilon^{-1}, \qquad (3)$$

where:
ε corresponds to the deformation, expressed in µε (microstrains), corresponding to $10^{-4}\%$. The deformation ε is a normalized variation in length, such that:

$$\varepsilon = \frac{d\Lambda}{\Lambda} \times 10^{-2} \qquad (4)$$

x is the multiplication operator.

Expression (3) was obtained considering the case where the membrane 18 is made of $SiO_2$, and the index jump between the first material and the second material is $10^{-3}$. It is based on a uniform deformation of each Bragg mirror, as shown in FIG. 3B. According to expression (3), for a deformation of 1 microstrain, the shift $d\lambda_B$ in the Bragg wavelength $\lambda_B$ is 1.2 pm.

In FIG. 3C, a non-uniform deformation of the waveguide 20 has been shown, certain segments of the Bragg mirrors being less deformed than others.

Figure 3D:
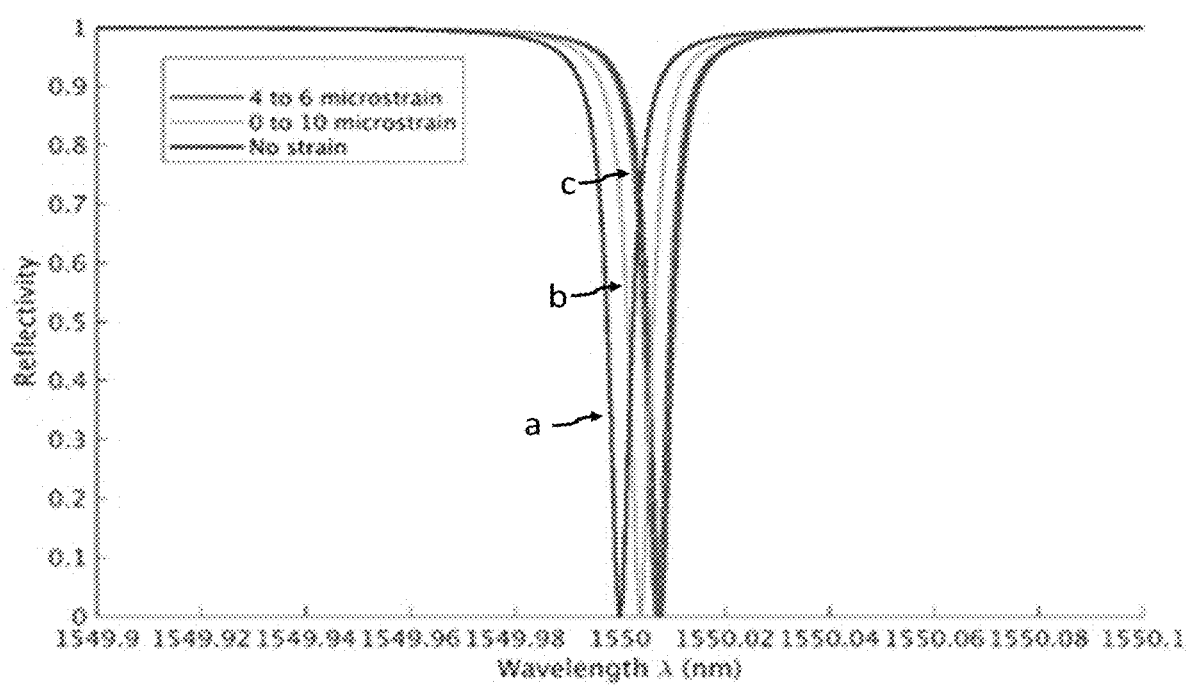
FIG. 3D shows a variation in the reflection spectral band of a waveguide, such as shown in FIG. 3C, under the effect of deformations.

FIG. 3D is a model showing the variation in the reflection spectrum of a Bragg mirror, in a configuration such as described with reference to FIG. 3C. Curves a, b and c correspond to an absence of deformation, to a deformation of 0 to 10 microstrains, and to a deformation comprised between 4 to 6 microstrains, respectively. The spectral shift is small, smaller than 10 pm. Curves b and c correspond to the same average deformation of the waveguide, equal to 5 microstrains. The shift in the resonant wavelengths between these two configurations is due to the variation in strain along the axis of the waveguide, in the range 0-10 microstrains and 4-6 microstrains respectively. The more uniform the deformation, the larger the spectral shift of the resonant wavelength, under the effect of the deformation.

Preferably, the waveguide 20 extends over the portions of the membrane 18 that are subjected to the largest deformation. The membrane 18 exhibits one or more vibration antinodes, at which the amplitude of vibration is maximum. Each antinode may be determined by modeling and/or experimentally. Preferably, waveguide 20 extends over at least one antinode of vibration of the membrane. This maximizes the deformation of the waveguide 20, this further increasing the spectral shift resulting from the deformation. A better sensitivity is thus obtained.

Figure 3E:
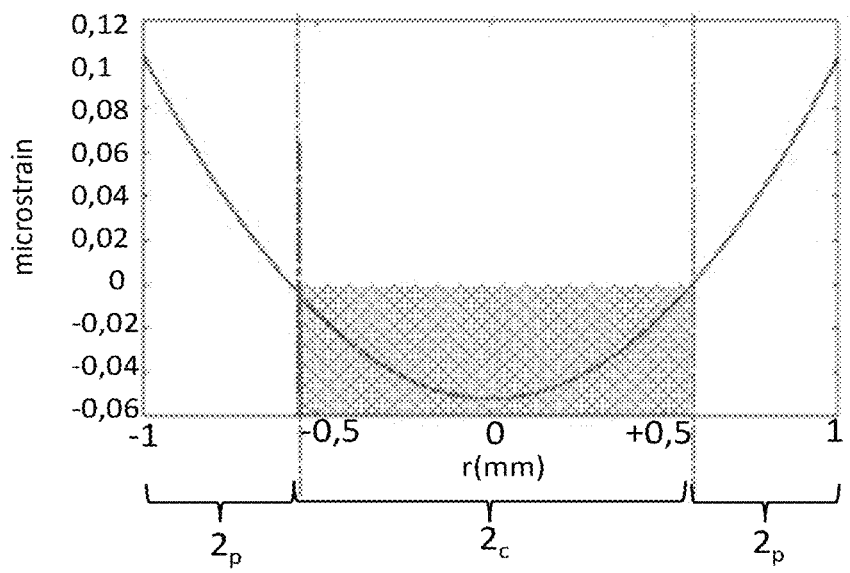
FIG. 3E shows a deformation amplitude of a membrane, along a diameter of the latter.

The inventors have modeled a deformation of a membrane 18, such as schematically shown in FIGS. 1A and 1D. The modeled membrane was made of $SiO_2$, was of 1 mm radius and 10 µm thickness, and was subjected to a pressure of 1 Pa. The deformation of the membrane, along one of its diameters, is shown in FIG. 3E, the x-axis corresponding to the distance from the center of the membrane (in mm) and the y-axis corresponding to the deformation, in microstrains. The resonant cavity 26 is preferably placed level with the maximum amplitude of deformation, i.e. at the center of the membrane 18. The simulation illustrated in FIG. 3E shows that, with this membrane, application of a pressure of 1 Pa induces a deformation of some $10^{-2}$ microstrains.

In FIG. 3E, the deformation of the membrane is negative in the central portion $2_c$ and positive in the peripheral portion $2_p$. The resonant cavity 26 is advantageously placed on a segment of the membrane 2 in which, under the effect of the vibration of the membrane, the deformation is of same sign, irrespective of whether it is a question of a compression or of an expansion.

Figure 3F:
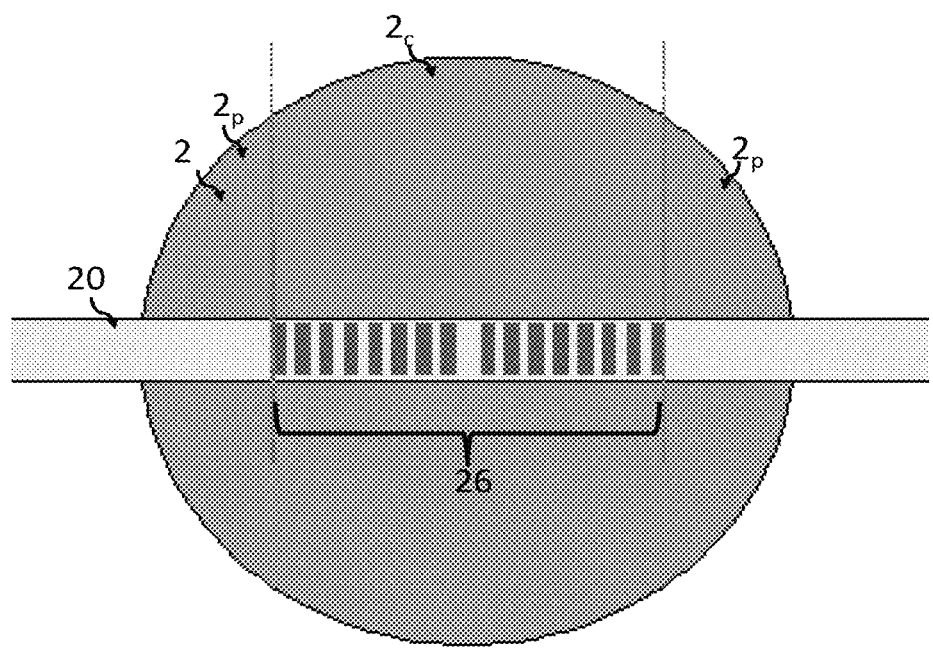
FIG. 3F shows a waveguide that is optimally positioned, for the deformation shown in FIG. 3D.

FIG. 3F schematically shows a waveguide 20 the resonant cavity 26 of which is positioned on the central part $2_c$ of the membrane 2, the waveguide extending, on either side of the center of the membrane, a distance of ±0.5 mm from the center. Under the effect of the vibration of the membrane, the deformation is alternately negative (ε<0), as shown in FIG. 3E, then positive. When the deformation is negative, the optical cavity is compressed: the segments of the second material 22 get closer to one another. When the deformation is positive, the optical cavity expands: the segments of the second material 22 move away from one another.

FIGS. 4A and 4B schematically show the operation of the servo circuit 41, the function of which is to servo-control the wavelength $\lambda_{32}$ to the resonant wavelength $\lambda_r$ of the resonant cavity 26 formed in the guide 20. The servo circuit 41 locks the wavelength $\lambda_{32}$ to the resonant wavelength $\lambda_r$. The locking is of the type usually designated top-of-fringe locking. It is a question of a circuit employing Pound-Drever-Hall servo technique, such a circuit for example being described in the publication Chow J. H. "Phase-sensitive interrogation of fiber Bragg grating resonators for sensing applications", J. Light. Technol., vol. 23, No. 5, pp. 1881-1889, May 2005, or even in the publication Black E. "An introduction to Pound-Drever-Hall laser frequency stabilization", Am. J. Phys. 69 (1), January 2001.

The servo circuit 41 comprises a modulator $41_1$, for modulating the wavelength $\lambda_{32}$ of the auxiliary light wave 32 emitted by the auxiliary light source 30, at a modulation frequency that may vary from 10 kHz to several hundred MHz. The modulation frequency of the emission wavelength $\lambda_{32}$ is much higher than the maximum acoustic frequency addressed by the device. It may for example be higher than 10 times the maximum acoustic frequency addressed by the device. The intensity of the light wave 34, emerging from the waveguide 20 and detected by the photodetector 36, is transmitted to the servo circuit 41, the latter measuring a function h expressing a variation in the intensity detected by the photodetector 36 as a function of the wavelength modulation.

Depending on the sign of the function h, an error signal is sent to the light source, so as to increase or decrease the emission wavelength $\lambda_{32}$. For example, when the detected variation in intensity as the wavelength increases is negative, the emission wavelength is gradually decreased. When the detected variation in intensity as the wavelength increases is positive, the emission wavelength is increased. When the detected variation in intensity caused by the modulation is close to zero, the emission wavelength corresponds to the resonant wavelength of the waveguide. The servo circuit 41 uses the fact that:

when $\lambda_{32} < \lambda_r$, an increase in the wavelength $\lambda_{32}$ results in an increase in the intensity of the transmitted wave 34. Conversely, a decrease in the wavelength $\lambda_{32}$ results in a decrease in the intensity of the transmitted wave 34;

when $\lambda_{32} > \lambda_r$, an increase in wavelength $\lambda_{32}$ results in a decrease in the intensity of the transmitted wave 34. Conversely, a decrease in the wavelength $\lambda_{32}$ results in an increase in the intensity of the transmitted wave 34.

Thus, by applying a small modulation to the wavelength $\lambda_{32}$ of the auxiliary light wave 32, and by observing the effect of the modulation on the intensity of the transmitted light wave 34, the auxiliary light source 30 may be servo-controlled, to make the wavelength $\lambda_{32}$ of the auxiliary light wave 32 track the resonant wavelength $\lambda_r$ of the waveguide 20.

Tracking the resonant wavelength by top-of-fringe locking allows the resonant wavelength to be tracked with a wavelength sensitivity of the order of $10^{-6}$ pm when the acoustic frequency is higher than 10 kHz, or of the order of $10^{-3}$ pm when the acoustic frequency is lower than 1 kHz. In light of expression (3), which applies to an $SiO_2$ membrane, it is estimated that such a sensitivity will allow a deformation of the membrane of the order of a few picostrains, or equivalent to a few m Pa, to be estimated. The Pound-Drever-Hall method is therefore appropriate, given the small spectral shifts of the resonant cavity 26, said spectral shifts possibly being of the order of a few pm.

Tracking the resonant wavelength by top-of-fringe locking also allows the tracking to be made insensitive to fluctuations in the resonant wavelength of the cavity 26 under the effect of any variation in environmental parameters, such as temperature and humidity.

FIGS. 5A to 5C illustrate the relationship between the periodic time-dependent variation $\lambda_r(t)$ in the resonant wavelength $\lambda_r$, when the membrane 18 vibrates under the effect of a photoacoustic wave 6, and the amplitude of the acoustic wave. Because of the servo-control performed by the servo circuit 41, the periodic time-dependent variation in the emission wavelength $\lambda_{32}(t)$ is considered to correspond to the time-dependent modulation of the resonant wavelength $\lambda_r(t)$ induced by membrane vibration. FIG. 5A shows a spectrum of the transmitted light wave 34, and a spectral shift $d\lambda_r$ under the effect of deformation of the waveguide 20. FIG. 5B shows the time-dependent modulation of the resonant wavelength $\lambda_r$ resulting from the deformation of the waveguide 20, the modulation being periodic and of frequency $f_{\lambda_r}$ corresponding to the acoustic frequency $f_a$. The servo circuit 41, by servo-controlling the wavelength $\lambda_{32}$ to the resonant wavelength, allows such a modulation to be determined. This modulation is transmitted to the processing unit 42, the latter computing an amplitude $A_{\lambda_r}$ of the modulation of the resonant wavelength. On the basis of said amplitude, the processing unit 42 estimates the amplitude of vibration of the membrane, which corresponds to the acoustic frequency $f_a$ of the photoacoustic wave 6. On the basis of the amplitude of vibration of the membrane, at the acoustic frequency $f_a$, it is possible to determine whether the analyte 4 is present in the medium, or to estimate a concentration of the analyte 4 in the medium.

Estimation of a concentration of analyte 4 in the medium may require a calibration to be performed beforehand, so as to establish a relationship:

between the concentration of the analyte and the amplitude of vibration of the membrane;

or between the concentration of the analyte and the amplitude of modulation of the resonant wavelength.

It will be noted that the determination of the acoustic amplitude $A_a$ does not necessarily require a determination of the value of the resonant wavelength, but only a precise determination of the modulation amplitude $A_{\lambda_r}$.

FIGS. 6A to 6D illustrate the main steps allowing a non-fiber-optic waveguide 20 to be formed on a membrane 18.

A substrate 100, an Si substrate for example, on which a 4 μm thick first layer 101, of $SiO_2$ (index 1.44) for example, and a 1 μm thick second layer 102, of SiON (silicon oxynitride—index 1.60) for example, have been deposited, is provided. See FIG. 6A.

The method comprises:

etching the second layer 102, using photolithography, so as to form the waveguide 20. See FIG. 6B. In this example, SiON corresponds to the first material 21 of the waveguide.

etching the back side of the substrate 100, so as to release one portion of the first layer 101, said portion forming the suspended membrane 18. This step also allows the enclosure 17, bounding the hollow cavity 16, to be formed. See FIG. 6C.

exposing, point-by-point, the waveguide 20 to femtosecond laser pulses, so as to form cavities of a second material 22, this operation conventionally being designated inscription. See FIG. 6D. Under the effect of the exposure to the laser, the index of the SiON changes locally. The exposed SiON then corresponds to a second material 22, the refractive index $n_2$ of which is different from that of the unexposed SiON. Specifically, the exposure generates microbubbles, this inducing a change in the refractive index. This results in a modulation of the refractive index of waveguide 20, along the axis of propagation of the light, inside the waveguide.

The duration of each pulse is for example equal to 100 fs, at the wavelength of 800 nm, the energy of each pulse being 30 nJ. The pulse frequency may be comprised between a few Hz and 200 kHz.

Another exposure technique is UV photoinscription, which is described in the publication Chow J. H. "Phase-sensitive interrogation of fiber Bragg grating resonators for sensing applications", J. Light. Technol., vol. 23, No. 5, pp. 1881-1889, May 2005. UV photoinscription for example allows optical fibers to be microstructured.

The modulation of the refractive index resulting from exposure is relatively small, of the order of $10^{-3}$. However, inscription by femtosecond laser allows Bragg mirrors to be produced over short lengths, for example of the order of one mm. This type of exposure allows a resonant cavity 26 of high finesse to be obtained, the width of the resonant peak being smaller than a few tens of pm, or even smaller than 10 pm, and possibly being of the order or less than 5 pm.

It is possible to increase the length over which each Bragg mirror extends. This decreases the width of the resonant peak.

Thus, when the photoacoustic first embodiment is employed, it is possible to detect the presence of an analyte, or even estimate its concentration, in an analyzed medium, by implementing the following steps, which are shown in FIG. 7A:

Step 110: applying the device 1 to the medium, such that the contact face is held against the medium;

Step 120: activating the exciting light source 10, the exciting light source emitting an exciting light wave 11, which is pulsed or amplitude-modulated at an excitation frequency $f_{11}$, with a wavelength corresponding to an absorption wavelength $\lambda_4$ of the analyte;

Step 130: under the effect of the illumination of the medium by the exciting light wave, obtaining emission of a photoacoustic wave 6, which propagates through the hollow cavity 16, after which the membrane of the transducer vibrates at the excitation frequency $f_{11}$, such that the resonant frequency $\lambda_r$ of the waveguide 20 of the transducer is modulated periodically at a modulation frequency $f_{\lambda_r}$ equal to the excitation frequency $f_{11}$;

Step 140: determining, by means of the servo circuit 41, a time-dependent modulation of a resonant wavelength $\lambda_r$ of the waveguide 20 at the excitation frequency $f_{11}$, the resonant wavelength corresponding to a transmission peak of the waveguide;

Step 150: depending on the time-dependent modulation determined by the servo circuit, computing an amplitude of modulation of the resonant wavelength at a frequency dependent on the excitation frequency, and notably at a frequency two times higher than the excitation frequency;

Step 160: detecting the presence of the analyte in the medium and/or estimating an analyte concentration depending on the amplitude of the modulation.

The presence of analyte may be detected or its concentration estimated through a calibration carried out using a calibration sample representative of the medium 2 and containing a known quantity of analyte.

FIGS. 8A to 8C illustrate a second embodiment, referred to as the photothermal embodiment, of a device 1' according to the invention. The device 1' is configured to be applied against a medium 2 to be analyzed.

The device 1' comprises components such as described with reference to the first embodiment. One difference is that the membrane 18 forms the bearing wall 3, through which an aperture 13 is formed.

The device 1' comprises an exciting light source 10, which emits an exciting light wave 11. It is a question of a pulsed laser source, the pulse frequency for example being comprised between 10 Hz and 500 Hz, and for example equal to 100 Hz. The exciting light wave 11 propagates to the medium 2. According to this embodiment, the exciting light source is configured such that the exciting light wave 11 propagates to the medium 2 through the aperture 13 formed through the membrane 18.

Under the effect of the presence of an analyte 4 in the medium, some of the exciting wave is absorbed. This results in heating 5 of the medium 4. When the analyte is present in a superficial portion of the medium, the heating of the medium 5 propagates, via diffusion of heat, to the membrane 18 forming the contact face. By superficial portion of the medium, what is meant is a portion comprised between the contact face and a depth ranging up to 2 or 3 times the thermal penetration depth of the material forming the analyzed medium.

The membrane 18 preferably has a thermal conductivity, such that the temperature of the membrane may be considered to follow the variations in the temperature of the medium 2, possibly after a time lag. The membrane is thin enough to have such a thermal conductivity.

According to this embodiment, the transducer 15 is a thermal transducer: its function is to detect, and preferably to quantify, a periodic modulation of the temperature of the membrane under the effect of the periodic excitation of the medium 2 by the exciting light wave 11.

The transducer 15 comprises an auxiliary light source 30, a waveguide 20, a photodetector 36 and a servo circuit 41 such as described with reference to the photoacoustic embodiment.

Under the effect of heating of the membrane 18, the temperature of the waveguide 20 varies. This results in a variation in the resonant wavelength λr, notably due to the variation in the refractive indices of the materials 21, 22 from which the waveguide is made.

The variation in the resonant wavelength under the effect of temperature may be expressed by the expression:

$$\frac{1}{\lambda_B} \times \frac{\partial \lambda_B}{\partial T} = 6.67 \times 10^{-6} \, °C.^{-1} \quad (6)$$

T corresponding to temperature.

When the wavelength $\lambda_{32}$ of the auxiliary source 32 is equal to 1.55 µm, the sensitivity of the transducer may be estimated to be 11 pm/° C.

When the photothermal embodiment is employed, it is possible to detect the presence of an analyte, or even estimate its concentration, in an analyzed medium, by implementing the following steps, which are shown in FIG. 7B.

Step 110: applying the device 1 to the medium, such that the contact face, in the present case the membrane, is held against the medium;

Step 120: activating the exciting light source 10, the exciting light source emitting an exciting light wave 11, at an excitation frequency $f_{11}$, with a wavelength corresponding to an absorption wavelength $\lambda_4$ of the analyte;

Step 135: under the effect of the illumination of the medium by the exciting light wave, obtaining periodic heating of the medium 2, the heat generated propagating, via diffusion of heat, to the membrane 18, such that the resonant frequency $\lambda_r$ of the waveguide 20 of the transducer is periodically modulated at a modulation frequency $f_{\lambda_r}$ equal to the excitation frequency $f_{11}$.

Step 140: determining, by means of the servo circuit 41, a time-dependent modulation of a resonant wavelength $\lambda_r$ of the waveguide 20, at the excitation frequency $f_{11}$, the resonant wavelength corresponding to a transmission peak of the waveguide, the modulation;

Step 155: depending on the time-dependent variation determined by the servo circuit, computing an amplitude of variation of the resonant wavelength;

Step 165: detecting the presence of the analyte in the medium and/or estimating an analyte concentration depending on the variation.

The presence of analyte may be detected or its concentration estimated through a calibration carried out using a calibration sample representative of the medium 2 and containing a known quantity of analyte.

The invention will possibly be implemented on gas, liquid or solid samples, in analyte-detection applications in the environmental field, the industrial field (the field of the food industry for example), or in the biomedical field.

The invention claimed is:

1. A detecting device configured to be applied, via a contact face, against a medium to be analyzed, the analyzed medium being liable to contain an analyte, which absorbs light at an absorption wavelength, the device comprising:
   an aperture formed in the contact face;
   a first light source configured to emit a first light wave, which is pulsed or amplitude-modulated at a first frequency, in an excitation spectral band comprising the absorption wavelength, the device being configured so that the first light wave propagates through the aperture toward the analyzed medium; and
   a transducer configured to measure a response of the medium following periodic heating of the medium resulting from absorption, by the analyte, of some of the first light wave, wherein the transducer includes
      a membrane, carrying a waveguide, the waveguide comprising a first reflector and a second reflector, each of the first and second reflectors reflecting light in a reflection spectral band, the first reflector and the second reflector being spaced apart from each other so as to form a resonant optical cavity, the resonant optical cavity defining a resonant wavelength in the reflection spectral band such that the waveguide:
      transmits light at the resonant wavelength; and reflects light, in the reflection spectral band, not of the resonant wavelength, wherein the transducer further comprises
a second source of laser light, configured to emit a second light wave, in the reflection spectral band, into the waveguide;
a photodetector, arranged to detect a light wave transmitted by the waveguide at the resonant wavelength; and
a servo circuit connected to the photodetector and configured to determine a periodic time-dependent modulation of the resonant wavelength of the resonant optical cavity, wherein the waveguide is formed directly on the membrane;
the membrane is configured to deform periodically under an effect of the periodic heating of the medium so that the resonant wavelength is periodically modulated;
the servo circuit further comprises a servo loop, connected to the second light source, and configured to servo-control a wavelength of the second light wave emitted by the second light source to the resonant wavelength of the resonant optical cavity; and
the second light source is different than the first light source.

2. The device as claimed in claim 1, further comprising a processing circuit, connected to the servo circuit, and configured to:
estimate an amplitude of the periodic time-dependent modulation of the resonant wavelength; and
detect a presence of the analyte in the medium depending on the estimated amplitude.

3. The device as claimed in claim 2, wherein the processing circuit is further configured to estimate a concentration of the analyte in the medium depending on the estimated amplitude.

4. The device as claimed in claim 1, further comprising a hollow cavity that opens onto the aperture, the transducer being connected to the hollow cavity, and wherein the transducer is an acoustic transducer configured to detect an amplitude of a photoacoustic wave that propagates from the aperture through the hollow cavity, such that, under an effect of the illumination of the medium by the first light wave, the membrane vibrates at the excitation frequency, resulting in the periodic time-dependent modulation of the resonant wavelength, at a modulation frequency equal to the excitation frequency.

5. The device as claimed in claim 4, wherein the membrane lies parallel to the contact face.

6. The device as claimed in claim 4, wherein the membrane bounds one portion of the hollow cavity.

7. The device as claimed in claim 1, wherein:
the membrane of the transducer forms the contact face of the device, the contact face being configured to be applied so as to make contact with the medium;
the aperture extends through the membrane; and
the transducer is a thermal transducer, such that, under an effect of the illumination of the medium by the first light wave, a temperature of the membrane exhibits a periodic time-dependent variation, resulting in the periodic time-dependent modulation of the resonant wavelength.

8. The device as claimed in claim 1, wherein at least one of the first and second reflectors is a Bragg mirror, formed via a periodic modulation of a refractive index along the waveguide.

9. The device as claimed in claim 1, wherein the servo circuit implements a Pound-Drever-Hall servo technique.

10. The device as claimed in claim 1, wherein:
the first reflector is a first Bragg mirror;
the second reflector is a second Bragg mirror; and
the first Bragg mirror and the second Bragg mirror form a Bragg mirror, the Bragg mirror comprising a defect, the first Bragg mirror and the second Bragg mirror corresponding to portions of the Bragg mirror lying on either side of the defect, respectively.

11. The device as claimed in claim 1, wherein:
the membrane exhibits, when the membrane deforms, at least one vibration antinode, an amplitude of vibration being maximum at each antinode; and
the waveguide lies level with at least one of the at least one vibration antinode.

12. The device as claimed in claim 1, wherein the first reflector and the second reflector are obtained by inscribing the waveguide with a laser beam, so as to obtain a periodic modulation of a refractive index in the waveguide.

13. A method for detecting an analyte in a medium, the analyte absorbing light at an absorption wavelength, the method comprising:
applying the device according to claim 1 against the medium, such that the contact face of the device is held against the medium;
activating the first light source, the first light source emitting the first light wave, which is pulsed or amplitude-modulated at the first frequency, with a wavelength corresponding to an absorption wavelength of the analyte;
determining, by means of the servo circuit, the periodic modulation of the resonant wavelength of the waveguide of the transducer, at a modulation frequency corresponding to the first frequency, the resonant wavelength corresponding to a transmission peak of the waveguide; and
depending on the periodic modulation determined by the servo circuit, detecting a presence of the analyte in the medium.

14. The method as claimed in claim 13, wherein the device further includes a hollow cavity, the method further comprising:
following the applying step, heating the medium periodically, at the first frequency, so as to cause an emission of a photoacoustic wave, which propagates through the hollow cavity, and under an effect of which the membrane of the transducer vibrates at the first frequency, such that the resonant wavelength of the waveguide of the transducer is modulated at a modulation frequency equal to the first frequency; and
in the determining step:
estimating an amplitude of the periodic modulation of the resonant wavelength, at the modulation frequency; and
detecting the presence of the analyte depending on the estimated amplitude.

15. The method as claimed in claim 13, further comprising:
following the applying step, heating the medium periodically, at the first frequency, so as to cause periodic heating of the membrane at the first frequency, such that the resonant wavelength of the waveguide of the transducer is modulated at a modulation frequency corresponding to the first frequency; and in the determining step:
- estimating an amplitude of the periodic modulation of the resonant wavelength at the modulation frequency; and
- detecting the presence of the analyte depending on the estimated amplitude.

16. The method as claimed in claim 13, wherein the determining step further comprises estimating a concentration of the analyte in the analyzed medium.

17. A method for fabricating the device as claimed in claim 1, comprising:
- depositing a thin layer of a first material on a membrane, so as to form the waveguide; and
- inscribing the waveguide with a femtosecond laser beam, so as to obtain a periodic modulation of a refractive index of the waveguide.

18. The device of claim 1, wherein the resonant optical cavity is configured to be remote from the medium to be analyzed.

* * * * *